United States Patent
Tsukamoto et al.

[11] Patent Number: 5,160,161
[45] Date of Patent: Nov. 3, 1992

[54] WORKING FLUID CIRCUIT WITH LINE PRESSURE CONTROL FOR VEHICLE ACTIVE SUSPENSION SYSTEM

[75] Inventors: Masahiro Tsukamoto; Kazunobu Kawabata, both of Kanagawa, Japan

[73] Assignee: Nissan Motor Company, Limited, Japan

[21] Appl. No.: 658,610

[22] Filed: Feb. 21, 1991

[30] Foreign Application Priority Data

Feb. 23, 1990 [JP] Japan ................................. 2-43725

[51] Int. Cl.⁵ .................................................. B60G 11/26
[52] U.S. Cl. ..................................... 280/707; 280/714; 364/424.05
[58] Field of Search ......................... 280/707, 709, 714; 364/424.05

[56] References Cited
U.S. PATENT DOCUMENTS

| | | | |
|---|---|---|---|
| 4,865,348 | 9/1989 | Hano et al. | 280/707 |
| 4,967,360 | 10/1990 | Fukunaga et al. | 280/707 |
| 4,973,080 | 11/1990 | Ikemoto et al. | 280/707 |
| 5,044,661 | 9/1991 | Kawabata | 280/707 |
| 5,044,662 | 9/1991 | Kawabata | 280/707 |

*Primary Examiner*—David M. Mitchell
*Assistant Examiner*—Paul Dickson
*Attorney, Agent, or Firm*—Lowe, Price, Leblanc & Becker

[57] ABSTRACT

An active suspension system for an automotive vehicle is provided. This suspension system includes generally a hydraulic circuit which supplies pressurized fluid to hydraulic cylinders for controlling vehicle height and attitude. The hydraulic circuit includes a line pressure holding unit and a line pressure control unit. The line pressure holding unit is operable to hold the line pressure when the line pressure is lowered below a preselected pressure level after stopping supply of the pressurized fluid to the hydraulic cylinders. The line pressure control unit restricts a flow rate of the pressurized fluid to the hydraulic cylinders to build up the line pressure gradually until the line pressure reaches the preselected pressure level after starting the supply of pressurized fluid to the hydraulic cylinders to allow smooth adjustment of vehicle height and attitude.

10 Claims, 12 Drawing Sheets

WORKING FLUID CIRCUIT WITH LINE PRESSURE CONTROL FOR VEHICLE ACTIVE SUSPENSION SYSTEM

BACKGROUND OF THE INVENTION

1. Field of The Invention

The present invention relates generally to an active suspension system for an automotive vehicle. More particularly, the invention relates to an active suspension system including a hydraulic circuit which prevents vehicle height from varying suddenly upon initiation of suspension control operation.

2. Description of The Background Art

U.S. Pat. No. 4,865,348, issued on Sept. 12, 1989, entitled "ACTIVELY CONTROLLED AUTOMOTIVE SUSPENSION SYSTEM WITH LINE PRESSURE CONTROL UNDER LOW FLUID SOURCE PRESSURE", assigned to Nissan Motor Company, Limited and Kayaba Kogyo Kabushiki Kaisha, discloses one typical construction of an active suspension system for a vehicle. This system includes generally a check valve disposed in a supply line between a hydraulic power source and a pressure control valve, a shut-off valve replaced in a return line, and a relief valve arranged parallel to the shut-off valve. The shut-off valve is responsive to power source pressure lower than a preselected pressure level to block fluid flow therethrough for maintaining pressure in a hydraulic circuit downstream of the shut-off valve at a constant level or neutral pressure. This prevents a vehicle body from being lowered suddenly when suspension control operation is stopped.

However, due to leakage of working fluid, the pressure held in the hydraulic circuit tends to drop gradually, resulting in pressure being lowered from the neutral pressure. Therefore, if an engine is started, actuating a hydraulic power source unit to discharge pressurized working fluid after the pressure drops in the hydraulic circuit, working fluid is fed to the pressure control valve quickly when the discharge pressure level exceeds the internal pressure of the hydraulic circuit, resulting in excessive increase in line pressure of the hydraulic cylinder, thus causing the vehicle body to rise suddenly. This gives passengers an unpleasant feeling.

SUMMARY OF THE INVENTION

It is accordingly one object of the present invention to avoid the disadvantages of the prior art.

It is another object of the invention to provide an active suspension system for a vehicle which prevents a vehicle body from rising suddenly upon initiation of suspension control operation.

According to one aspect of the invention, there is provided an active suspension system for an automotive vehicle which comprises suspension assemblies disposed between a vehicle body and suspension members which respectively support vehicle wheels rotatably, each of the suspension assemblies including a fluid cylinder adjustable of cylinder pressure for active suspension control, a fluid power source unit which supplies fluid pressurized above a preselected pressure level required for active suspension control to the fluid cylinders, a fluid circuit communicating between the fluid cylinders and the fluid power source unit for circulating the pressurized fluid therebetween, and pressure control means for providing fluid flow from the fluid power source unit to the fluid cylinders at a first flow rate and a second flow rate higher than the first flow rate, the pressure control means being responsive to line pressure below a preselected pressure level to provide the fluid flow at the first flow rate during a transient period of time until the line pressure provided to the fluid cylinders rises to the preselected pressure level after starting system operation and being responsive to the line pressure above the preselected pressure level to provide fluid flow at the second flow rate.

According to another aspect of the invention, there is provided an active suspension system for an automotive vehicle which comprises suspension assemblies disposed between a vehicle body and suspension members which respectively support vehicle wheels rotatably, each of the suspension assemblies including a fluid cylinder adjustable of cylinder pressure for active suspension control, a fluid power source unit which supplies pressurized fluid to the fluid cylinders, a fluid circuit communicating between the fluid cylinders and the fluid power source unit for circulating the pressurized fluid therebetween, a pressure holding means responsive to pressure provided for the fluid cylinders lower than a preselected pressure level for holding the pressure in the fluid circuit, a sensor means for monitoring the pressure in the fluid circuit to provide a signal indicative of a level thereof, and a pressure control means responsive to the signal from the sensor means for controlling fluid flow to the fluid cylinders, the pressure control means restricting the fluid flow provided for the fluid cylinders to a preselected flow rate while the pressure held by the pressure holding means provided for the fluid cylinders rises to the preselected pressure level after starting system operation.

According to a further aspect of the invention, there is provided an active suspension system for an automotive vehicle which comprises suspension assemblies disposed between a vehicle body and suspension members which respectively support vehicle wheels rotatably, each of the suspension assemblies including a fluid cylinder adjustable of cylinder pressure for active suspension control, a fluid power source unit which supplies pressurized fluid to the fluid cylinders, a fluid circuit communicating between the fluid cylinders and the fluid power source unit for circulating the pressurized fluid therebetween, a line pressure holding means responsive to line pressure supplied to the fluid cylinders lower than a preselected pressure level required for active suspension control for holding the line pressure in the fluid circuit, a sensor means for monitoring operation of the line pressure holding means to provide a signal indicative thereof, and a pressure control means disposed between the line pressure holding means and the fluid cylinders for controlling fluid flow supplied to the fluid cylinders, the pressure control means responsive to the signal from the sensor means to restrict a flow rate of the fluid flow supplied to the fluid cylinders to a preselected flow rate while line pressure holding operation of the line pressure holding means is operated after initiation of supply of pressurized fluid by the fluid power source unit.

DESCRIPTION OF THE PREFERRED EMBODIMENT

Figure 1:
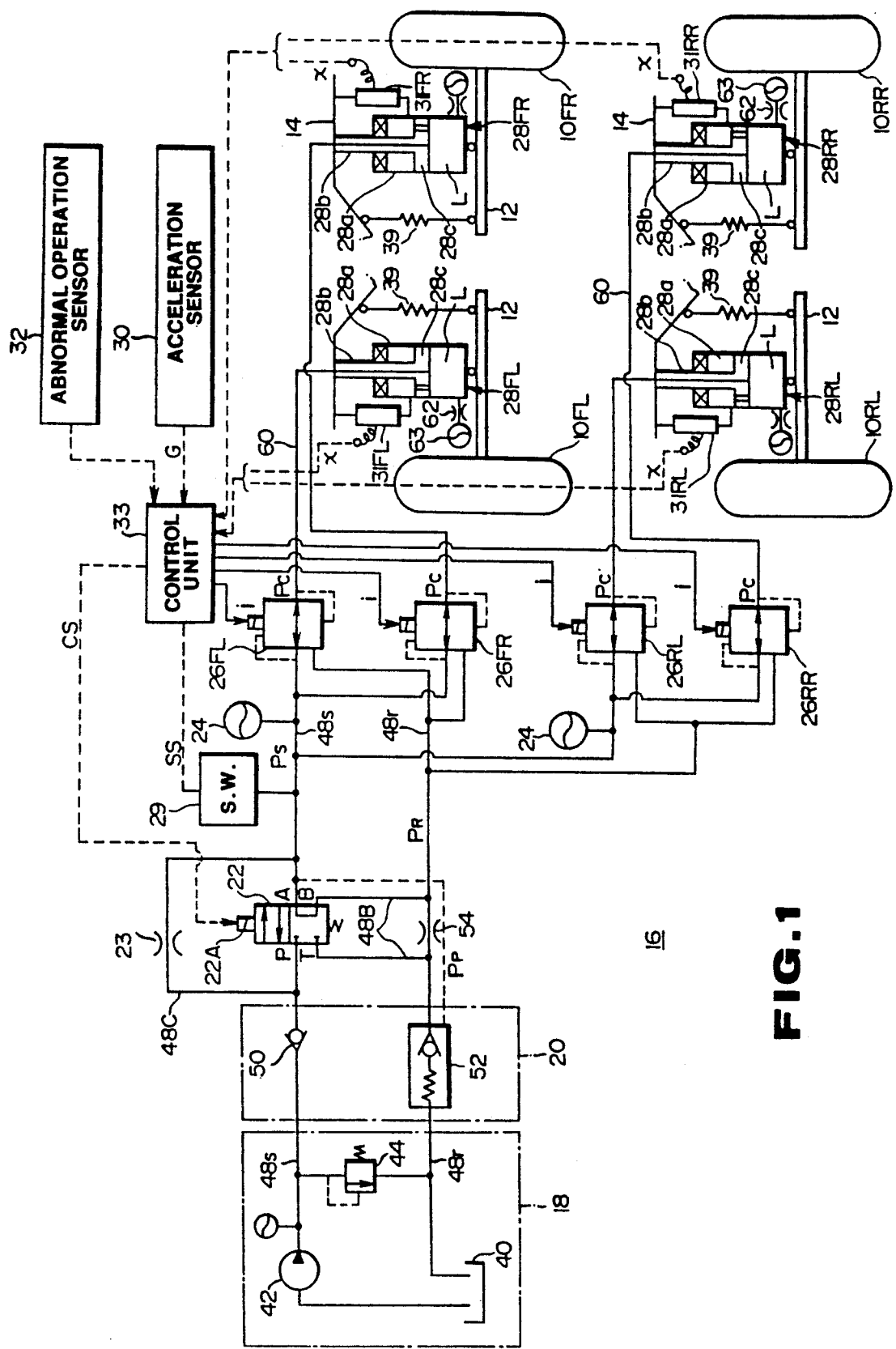
FIG. 1 is an illustration which shows an active suspension system with a hydraulic circuit according to the present invention.

Referring now to the drawings, wherein like numbers refer to like parts in several views, particularly to FIG. 1, a hydraulic active suspension system 16 according to the present invention is shown which is operable to effect suspension control for regulating vehicular height level and vehicular attitude by suppressing relative displacement betweem a vehicle body 14 and suspension members 12 which support front-left, front-right, rear-left, and rear-right wheels 10FL, 10FR, 10RL, and 10RR. Coil springs 39 are disposed between the vehicle body 14 and the suspension members 12 which support the mass of the vehicle body 14.

The active suspension system 16 includes generally a hydraulic power source unit 18, a line pressure holding unit 20, a fail-safe valve 22 functioning as a directional control valve, a throttle orifice 23 arranged parallel to the fail-safe valve, accumulators 24 for the front and rear wheels, each of which serves to accumulate fluid pressure for maintaining line pressure (internal pressure) at a preselected pressure level, pressure control valves 26FL to 26RR, and hydraulic cylinders for the wheels 10FL to 10RR. The active suspension system 16 further includes a pressure switch 29, an acceleration sensor 30 for controlling vehicular attitude, vehicle height sensors 31FL to 31RR for controlling vehicular height, an abnormal operation sensor 32 for fail-safe control, and a control unit 33 which applies command current i to the pressure valves 26FL to 26RR and controls the fail-safe valve 22 in response to signals output from the pressure switch, the acceleration sensor, the vehicle height sensor, and the abnormal operation sensor.

The hydraulic power source unit 18 includes a reservoir tank 40 storing working fluid, a hydraulic pump 42 driven by rotational power of an engine, and a relief valve 44 which adjusts the line pressure to a fixed pressure level. A supply line 48s and a return line 48r are fluidly connected to the reservoir tank 40. The supply line 48s directs the working fluid discharged by the hydraulic pump 42 to the line pressure holding unit 20.

The line pressure holding unit 20 includes a check valve 50 disposed in the supply line 48s and an operational check valve 52 disposed in the return line 48r. Line pressure downstream from the fail-safe valve 22 is provided as a pilot pressure $P_P$ to the operational check valve 52.

Figure 2:
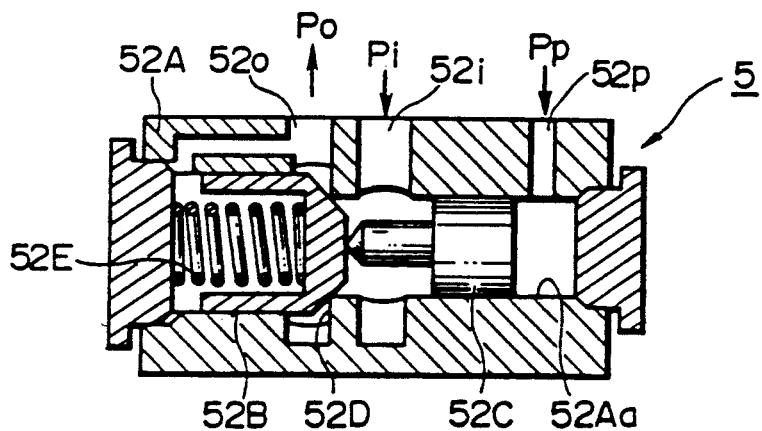
FIG. 2 is a sectional view which shows a structure of an operational check valve for holding line pressure in a hydraulic circuit.

Referring to FIG. 2, the operational check valve 52 is shown. This valve is designed as a pilot-operated check valve which includes a cylinderical valve housing 52A in which a valve bore 52Aa is formed communicating with an inlet port 52i, an outlet port 52o, and a pilot port 52p. A poppet 52B and a valve spool 52C are slidably disposed in the valve bore 52Aa. The inlet port 52i receives the working fluid returned through the return line 48r, the outlet port 52c directs the returned working fluid to the reservoir tank 40, and the pilot port 52p is communicated with the supply line 48s downstream from the fail-safe valve 22 for receiving the pilot pressure $P_P$.

Figure 3:
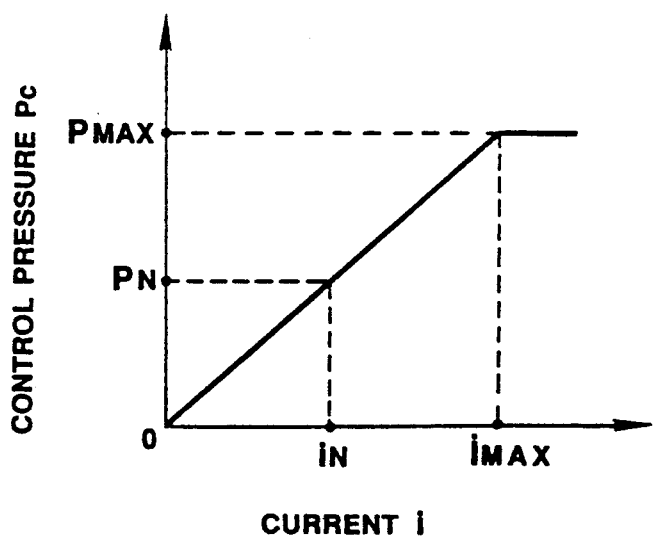
FIG. 3 is a graph which shows the relationship between output pressure of a pressure control valve and current applied thereto.

The poppet 52B is urged by a coil spring 52E against a valve seat 52D formed between the inlet port 52i and the outlet port 52o. The pilot pressure $P_P$ acts on a side surface of the spool 52c opposite the poppet 52B through the pilot port 52p. Assuming that the relief pressure of the poppet 52B (i.e., in this embodiment, neutral operation pressure $P_N$ of the pressure control valves 26FL to 26RR as shown in FIG. 3) is $P_{PO}$, an effective area of the spool 52C is A, a spring constant of the coil spring 52E is k, and displacement of the poppet is X, a preset pressure $F_O$ of the coil spring 52E may be expressed by the following equation.

$$F_O = P_{PO} \times A \qquad (1)$$

If a relation between the pilot pressure $P_P$ and pressure $P_i$ input to the inlet port 53i is $P_i \geq P_p$, the spool 52C is separated from the poppet 52B and transmits no thrusting force to the poppet 52B. Thus, the poppet 52B functions as a relief valve only. In a relation of $P_i \times A = P_{PO} \times A$ with respect to the pressure $P_i$ of the inlet port 52i, the poppet 52B is balanced. if $P_i$ is greater than $P_{PO}$ ($P_i > P_{PO}$), the poppet 52B is pushed by the valve spool 52C to establish fluid communication between the inlet port 52i and the outlet port 52o, and if $P_i$ is less than or equal to $P_{PO}$ ($P_i \leq P_{PO}$), the poppet 52B blocks a fluid path between the inlet port 52i and the outlet port 52o.

Additionally, if $P_i$ is less than $P_P$ ($P_i < P_P$), a force given by a relation of $(P_p - P_i) \times A$ is exerted to the spool 52C to be pushed against the poppet 52B. A force caused by the input pressure $P_i$ acts on both the poppet 52B and the spool 52C in opposite directions to be offset as internal pressure in the valve 52. The poppet 52B is thus balanced in the following relation.

$$F_o + k \times x = P_p \times A \qquad (2)$$

From the above equations (1) and (2), the check valve function of the poppet 52B is released ($x>0$) when $(P_P - P_{PO}) \times A > 0$ and thus the check valve 52 is opened when $P_P > P_{PO}$, while it is closed when $P_P \geq P_{PO}$.

The fail-safe valve 22 is designed as a four-port two-position electromagnetic directional control valve. This valve 22, as shown in FIG. 1, includes valve ports A and B, a pump port P, and a tank port T. The pump port P and the port A are communicated with each other through a bypass line 48C having an orifice 23 to communicate with the supply line 48s. The tank port T and the port B are communicated with each other through a bypass line 48B having an orifice 54 to communicate with the return line 48r. When the control unit 33 outputs a change signal $CS_{off}$ indicative of an OFF command signal to the electromagnetic solenoid 22A, the pump port P and port B are blocked from port A and the tank port T respectively and the ports A and B are communicated with each other when the fail-safe valve 22 is in a closed position. It will be appreciated that if the abnormal operation sensor 32 monitors abnormal operation of the system during vehicle travel, the control unit 33 is responsive to the signal from the abnormal operation sensor 32 to provide the change signal $CS_{off}$ indicative of an OFF command signal to the fail-safe valve 22 for closing the hydraulic circuit to seal the working fluid therein.

When the control unit 33 outputs the change signal $CS_{on}$ indicative of an ON command signal to the fail-safe valve 22, the pump port P and the port A, and the port B and the tank port T are communicated with each other (in an opened position) to connect between the supply line 48s and the return line 48r without flow rate limitation caused by the orifice 54.

The supply line 48s downstream from the fail-safe valve 22 includes branch lines to form hydraulic circuits for the front and rear wheels which include relatively large capacity accumulators 24. These branch lines also include branch lines to form hydraulic circuits for the left and right wheels which include the pressure control valves 26FL to 26RR. Return lines of the pressure control valves 26FL to 26RR are collected to the return line 48r to communicate with the reservoir tank 40 through the operational check valve 52 and the relief valve 44.

Each of the pressure control valves 26FL to 26RR is designed as a three-port proportional electromagnetic pressure reducing valve which is well known in the art. For example, U.S. Pat. No. 4,967,360, issued on Oct. 30, 1990 and assigned to the applicant common to the present invention, discloses a valve of this type, disclosure of which is incorporated herein by reference. The pressure control valve includes a valve housing having a cylindrical valve bore in which a valve spool is slidably disposed and a proportional solenoid installed in the valve housing. The proportional solenoid is operable to adjust pilot pressure acting on an end of the valve spool against feedback pressure acting on the other end thereof. Of three ports of the pressure control valve, a supply port and a return port are communicated with the supply and return lines 48s and 48r respectively, while an outlet port is communicated with a working chamber L of the hydraulic cylinder through a line 60. It will be noted that adjustment of command current i supplied to the proportional solenoid causes a displacement of the valve spool to be controlled, thereby causing control pressure $P_C$ to be output from the outlet port to be controlled according to the magnitude of a command current i as shown in FIG. 3. In FIG. 3, $P_{MAX}$ denotes a maximum control pressure corresponding to a preselected line pressure, $i_N$ and $P_N$ respectively denote a command current and control pressure during neutral operation of the valve.

The hydraulic cylinders 28FL to 28RR, as shown in FIG. 1, respectively include working chambers L each of which is defined by a piston 28c in a cylinder tube 28a. A lower end of the cylinder tube 28a is attached to the suspension member 12, while an upper end of a piston rod 28b is attached to the vehicle body 14. Each of the working chambers L are fluidly connected to a relatively small capacity accumulator 63 for absorbing hydraulic vibration in an unsprung resonance range.

The pressure switch 29 is responsive to be turned on by a supply pressure $P_S$ greater than the neutral operation pressure $P_N$ in the supply line 48s between the pressure control valves 26FL to 26RR and fail-safe valve 22 and outputs a switch signal SS indicative thereof to the control unit 33. The acceleration sensor 30 is operable to monitor lateral acceleration acting on the vehicle body and outputs a signal G to the control unit 33 for vehicle attitude control. The vehicle height sensors 31FL to 31RR are provided with potentiometers which are arranged parallel to the hydraulic cylinders 28FL to 28RR. Each sensor is operable to monitor relative displacement between the vehicle body and a respective wheel to provide a signal X indicative thereof to the control unit 33. Further, the abnormal operation sensor 32 monitors operation of an electrical source circuit, the hydraulic power source unit 18, and the pressure control valves 26FL to 26RR to provide a signal indicative of abnormal operation such as disconnection of the circuit to the control unit 33, and so forth.

The control unit 33 is activated in response to an ON signal from an ignition switch (not shown) to carry out given programs for adjusting vehicle attitude variation and vehicle height, as described hereinafter in detail, while when the ignition switch is turned off, it is maintained in service by a holding timer for a preselected time (for example, several minutes) for carrying out the given programs.

The control unit 33 includes a microcomputer which carries out the given programs to calculate command values based on the signals output from the acceleration sensor 30, the vehicle height sensors 31FL to 31RR for controlling vehicle attitude variation to provide the command current i to the pressure control valves 26FL to 26RR. The control unit 33 is also responsive to the signal indicative of abnormal operation output from the abnormal operation sensor 32 to provide the change signal $CS_{off}$ to the fail-safe valve 22 to forcibly turn off the fail-safe valve 22.

Figure 4:
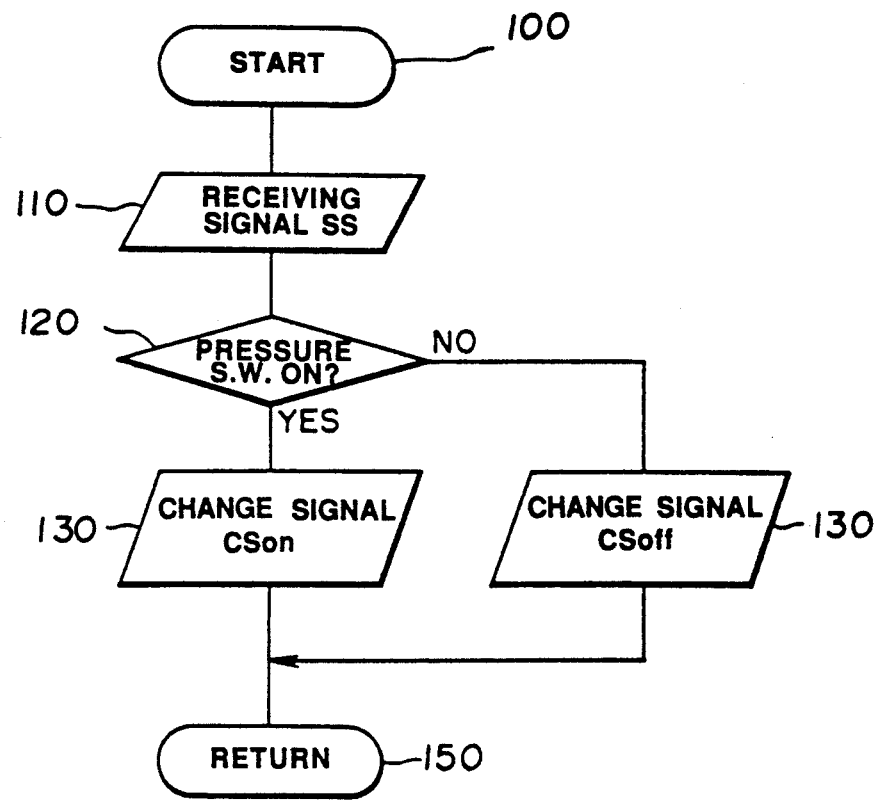
FIG. 4 is a flowchart which shows logical steps performed by a control unit of a first embodiment.

Referring to FIG. 4, there is shown a flowchart of a program or sequence of the logical steps performed by the control unit 33. This program is carried out by timer interrupt at a preselected time interval beginning from a time the ignition switch is turned on.

After entering the program in step 100, the routine proceeds to step 110 wherein the control unit 33 receives the signal SS output from the pressure switch 29. The routine then proceeds to step 120 wherein it is determined as to whether the pressure switch is turned on or off. If a YES answer is obtained which indicates that the supply pressure $P_S$ is greater than the neutral operation pressure $P_N$, the routine then proceeds to step 130 wherein the control unit 30 outputs the change signal $CS_{on}$ to turn on the fail-safe valve 22. If a NO answer is obtained, the routine proceeds to step 140 wherein the control unit 33 switches the change signal from $CS_{on}$ to $CS_{off}$ and outputs the change signal to the fail-safe valve 22. The routine then proceeds to step 150 to be returned to step 110.

Figure 5:
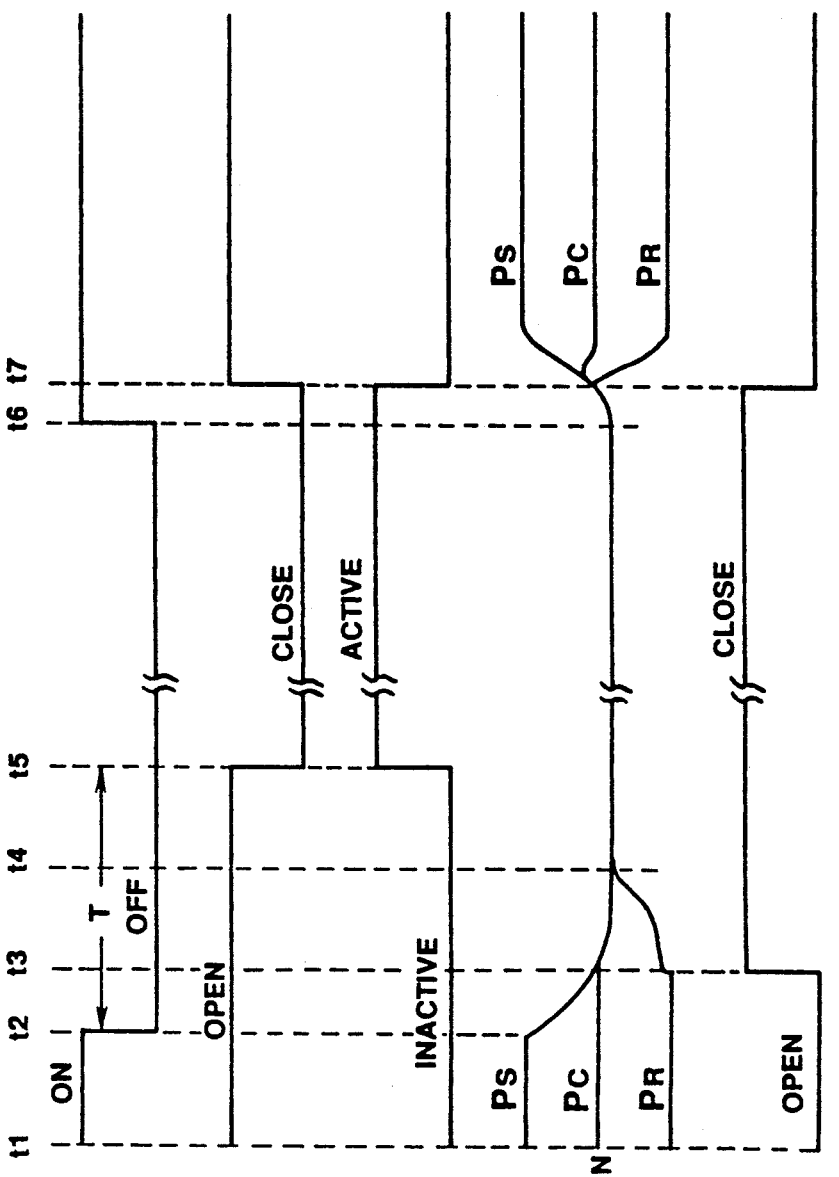
FIG. 5(a)-(e) is a timing chart which shows operational timing between an engine, a fail-safe valve, an orifice, and an operational check valve, in relation to pressure in a hydraulic circuit.

Referring to FIG. 5, a time chart is shown which represents operation timing relationships among the engine, the fail-safe valve 22, the throttle valve 23, the operational check valve 52, and pressure in the hydraulic circuit.

Assuming that engine operation is initiated by turning on the ignition switch at a time $t_1$ as shown in FIG. 5(a), the hydraulic pump 42 is actuated to supply the working fluid under pressure determined by the relief valve 44 to the line pressure holding unit 20 through the supply line 48s. At the same time, the control unit 33 outputs the current i to the pressure control valves 26FL to 26RR for controlling vehicle attitude variation and the vehicle height and carries out the program as shown in FIG. 4 to provide the change signal $CS_{on}$ to the fail-safe valve 22 on as shown in FIG. 5(b). Thus, the fail-safe valve 22 is actuated to establish fluid communication between the ports P and A and between the ports B and T to supply working fluid directly therethrough without restriction of flow rate by the orifice 23, as indicated by FIG. 5(c).

In this situation, the pressure $P_S$ greater than pressure $P_N$ is output from port A of the fail-safe valve 22 to be supplied to the pressure control valves 26FL to 26RR with the result that the pilot pressure $P_P$ of the operational check valve 52 is also greater than $P_N$. Thus, the operational check valve 52 is opened (FIG. 5(e)) to release the line pressure holding unit 20. Also, the accumulators 24 accumulate the high pressure supply $P_S$. With the operational check valve 52 opened, the return pressure $P_R$ of the return line 48r is kept substantially at atmospheric pressure.

At this time, if the vehicle is traveling with a standard load capacity on an even road, the control unit 33 provides neutral command current $i_N$ to the pressure control valves 26FL to 26RR to adjust the control pressure $P_C$ thereof to the neutral pressure $P_N$ ($P_C=P_N$). The hydraulic cylinders 28FL to 28RR are thereby controlled so that the working pressure of each of the chambers L is set to the neutral pressure $P_N$ as indicated by FIG. 5(d) to maintain the vehicle body at a level orientation and a regulated height.

When the ignition switch is turned off at a time $t_2$ after stopping the vehicle, the engine is, as shown in FIG. 5(a), stopped and the hydraulic pump 42 is also stopped. This causes the hydraulic power source unit 18 to discharge the supply pressure $P_S$ which is lowered to atmospheric pressure. The check valve 50 in the supply line 48s however serves to prevent the pressure in the pressure control valves 26FL to 26RR and the accumulators 24 from being suddenly reduced. After the ignition switch is turned off, the control unit 33 is maintained in service for a preselected time by operation of the holding timer therein for carrying out the given program for adjusting the vehicle height. Thus, the supply pressure $P_S$ remains in line, downstream from the check valve 50 is lowered gradually. Only when the supply pressure $P_S$ is greater than the pressure $P_N$, the vehicle height and attitude controls are operated.

If the supply pressure $P_S$ is equal to the pressure $P_N$ at a time $t_3$ caused by reduction in the pressure $P_S$, the operational check valve 52, as shown in FIG. 5(e), is closed to block the return line 48r, thereby causing the check valve 50 and the operational check valve 52 to be actuated together to block the hydraulic circuit downstream therefrom for holding the line pressure thereof at a constant level. This causes the return pressure $P_N$, as shown in FIG. 5(d), to begin to increase with the supply pressure $P_S$ being further decreased. At a time $t_4$ when the pressure $P_S$ is equal to the return pressure $P_R$, the line pressure in all portions of the hydraulic circuit downstream from the line pressure holding unit 20 to be held at a pressure substantially corresponding to the neutral operation pressure $P_N$. It will be appreciated that reduction in the vehicle height is slow before the line pressure is shut in the hydraulic circuit and thus this operation causes no discomfort to passengers.

Afterward, at a time $t_5$ when the set time T of the holding timer of the control unit 30 is elapsed, the control unit 30 switches the change signal to $CS_{off}$, as shown in FIG. 5(b), to close the fail-safe valve 22 for establishing fluid communication only between the ports A and B after the held vehicle height has been completely released. It will be noted that the closed fail-safe valve 22 causes the orifice 23 to be incorporated in hydraulic circuit holding the pressure below $P_N$, as shown in FIG. 5(d).

If a period of time during which the engine operation is stopped is long, the line pressure may drop further below $P_N$ while the engine remains inactive, as shown by a broken horizontal line in FIG. 5 (d), due to leakage of the working fluid or reduction in volume of the working fluid caused by reduction in temperature.

If the ignition switch is turned on to start engine operation again at a time $t_6$, the control unit 30 is actuated to perform vehicle height and attitude control and outputs the change signal $CS_{off}$ to the fail-safe valve 22 to keep it closed according to the program as shown in FIG. 4 because the supply pressure $P_S$ is less than the neutral pressure $P_N$ as mentioned previously. Additionally, rotation of the engine causes the hydraulic pump 42 to be driven to provide pressurized working fluid according to its rotational speed, pressure in the supply line 48s thereby increases rapidly. When this pressure exceeds the line pressure held in the hydraulic circuit, the working fluid enters into the hydraulic circuit through the check valve 50.

At that time, as the fail-safe valve 22 is closed as shown in FIG. 5(b), fluid flow from the check valve 50 passes through the bypass line 48C. It will be appreciated that the working fluid output from the check valve 50 is restricted in flow rate by the orifice 23 to be fed to the pressure control valves 26FL to 26RR with smooth elevation in the supply pressure $P_S$. This pressure elevation causes all line pressure in the blocked hydraulic circuit to rise gradually and thus the working fluid pressure of the hydraulic cylinders 28FL to 28RR are increased at a rate slower than that of the discharged pressure of the hydraulic pump 42 to raise the vehicle height gradually toward the regulated vehicle height level (as shown between $t_6$ and $t_7$ in FIG. 5). This smooth increase in the pressure of the hydraulic cylinders prevents the vehicle height from increasing suddenly due to a difference between the actual line pressure and the neutral pressure. This is advantageously comfortable to passengers.

Increase in the supply pressure $P_S$ to the neutral pressure $P_N$ at a time $t_7$ causes the pressure switch to be turned on. The control unit 33 therefore outputs the change signal $CS_{on}$ to the fail-safe valve to open the fail-safe valve 22 according to the program shown in FIG. 4 (and FIG. 5(b)) for allowing fluid flow in the supply and return lines 48s and 48r respectively. As a result, the working fluid flows through the supply line 48s without flow rate limitation caused by the orifice 23. It will be appreciated that the working fluid flows to the pressure control valves 26FL to 26RR with the supply pressure $P_S$ rising to the preselected line pressure, while the return pressure $P_R$ is gradually lowered from the line pressure held in the hydraulic circuit because the operational check valve 52 is opened.

The vehicle height control, after turning on the ignition switch, sets the control pressure $P_C$ for the hydraulic cylinders 28FL to 28RR to the neutral pressure $P_N$ speedily, to maintain the vehicle body at the regulated height level. Additionally, after the vehicle starts to run, in response to the signals output from the acceleration sensor 30, the control unit 33 provides command current i to the pressure control valves 26 FL to 26RR to vary the cylinder pressure of the hydraulic cylinders 28FL to 28RR for controlling the vehicle attitude based on the magnitude of lateral acceleration acting on the vehicle body.

Further, if the system breaks down during traveling due to a short circuit, broken wires, or other such malfunction, the abnormal operation sensor 32 detects this malfunction to output a signal indicative thereof to the control unit 33. The control unit 33 then switches the change signal to $CS_{off}$ to close the fail-safe valve 22 for blocking the supply line 48s and the bypass line 48B therein respectively with fluid communication between the supply line 48s and the bypass line 48B in the return line 48r. This causes the working fluid under high pressure to be directed to the return line 48r positively to build up back pressure in the pressure control valves 26FL to 26RR rapidly due to flow rate restriction by the orifice 54, preventing the working fluid in the hydraulic circuit from being returned to the reservoir tank 40 quickly to hold the working fluid therein momentarily. Afterward, the held working fluid is returned to the reservoir tank 40 gradually through the orifice 54. When the supply pressure $P_S$ (i.e., the return pressure $P_R$ and the control pressure $P_C$) is lowered to the neutral pressure $P_N$, the operational check valve 52 is closed to block the hydraulic circuit at about the neutral pressure $P_N$. As a result, the vehicle attitude when abnormal operation occurs is momentarily maintained. After this, the vehicle height is adjusted gradually to a level determined by the neutral pressure $P_N$. It will be noted that the vehicle attitude can't be controlled positively in this condition, however conventional passive suspension characteristics are achieved.

As mentioned above, the system of the invention is operable to monitor operation of the line pressure holding unit 20 at initiation of the engine operation to control a time at which to terminate the flow rate restriction caused by the orifice 23. Thus, when the line pressure holding is released, the given vehicle height and attitude controls are effectively accomplished without the flow rate restriction. It will be appreciated that after the line pressure in the hydraulic circuit reaches the neutral pressure after starting engine operation, there is no idle control time caused by lack of a flow rate as it would occur in the conventional system and thus a flow rate of the working fluid supply is returned to a full flow rate in timely fashion to provide working fluid sufficient for vehicle height and attitude control. Further, as mentioned previously, sudden increase in the vehicle height when starting engine operation is prevented.

Therefore, if timing when the supply pressure $P_S$ is equal to the neutral pressure $P_N$ ($P_S = P_N$) is changed after starting the engine operation, the system follows variation in the timing easily. It will be noted that even if the magnitude of reduction in the held pressure (the line pressure held in the hydraulic circuit) is changed dependent upon variation in a period of the engine being stopped, the same effect described above is obtained.

While in the above first embodiment, the pressure switch 29 is utilized for monitoring the supply pressure $P_S$ in the hydraulic circuit, a pressure sensor may be provided for determining whether the supply pressure $P_S$ is lowered to the neutral pressure $P_N$ or not.

Figure 6:
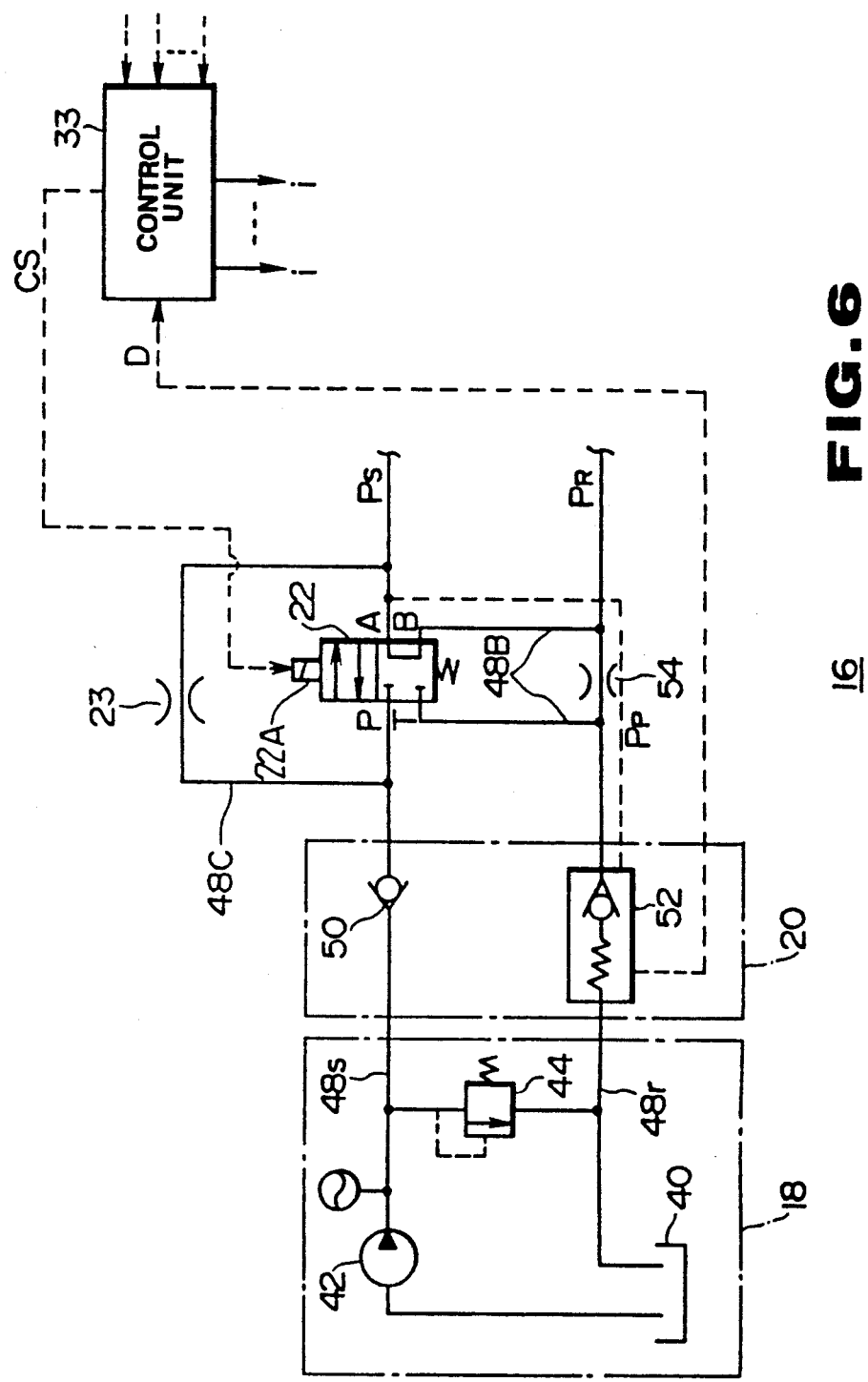
FIG. 6 is a circuit diagram which shows a hydraulic circuit of a second embodiment.

Referring to FIG. 6, an alternate embodiment of the active suspension system is shown. This system includes the same line pressure holding unit 20 as that of the above first embodiment and monitors mechanical variation in the line pressure holding unit to determine whether the unit is operated or not.

The line pressure holding unit 20, as shown in FIG. 6, includes a check valve 50 disposed in a supply line 48s and an operational check valve 52 disposed in a return line 48r.

Figure 7:
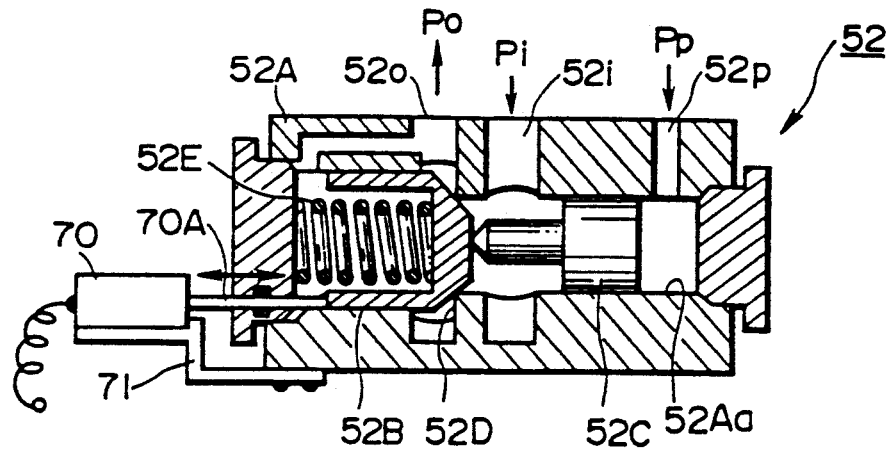
FIG. 7 is a sectional view which shows an operational check valve.

Referring to FIG. 7, the operational check valve 52 of a second embodiment according to the present invention is shown. In this embodiment, the valve 52 includes the same structure and function as the first embodiment, however, it includes a displacement sensor 70 which is mounted on a valve housing 52A outside a bottom plate of a poppet 52B side by means of a retainer 71. The displacement sensor 70 includes a movable pin 70A which is inserted into a valve bore 52Aa through the bottom plate of the valve housing 52A the top of the pin 70A is fixed on a bottom portion of the poppet 5B. The movable pin 70A is moved according to displacement of the poppet 52B in directions as shown by an arrow D in FIG. 7. The displacement sensor 70 provides a signal D' indicative of a position of the poppet 52B based on a displacement of the movable pin 70A to a control unit 33.

The system of the second embodiment includes operational check valve 52 having the displacement sensor 70 in place of the pressure switch 29 of the first embodiment and carries out the program explained below instead of the program as shown in FIG. 4. Other operation is the same as that of the first embodiment.

Figure 8:
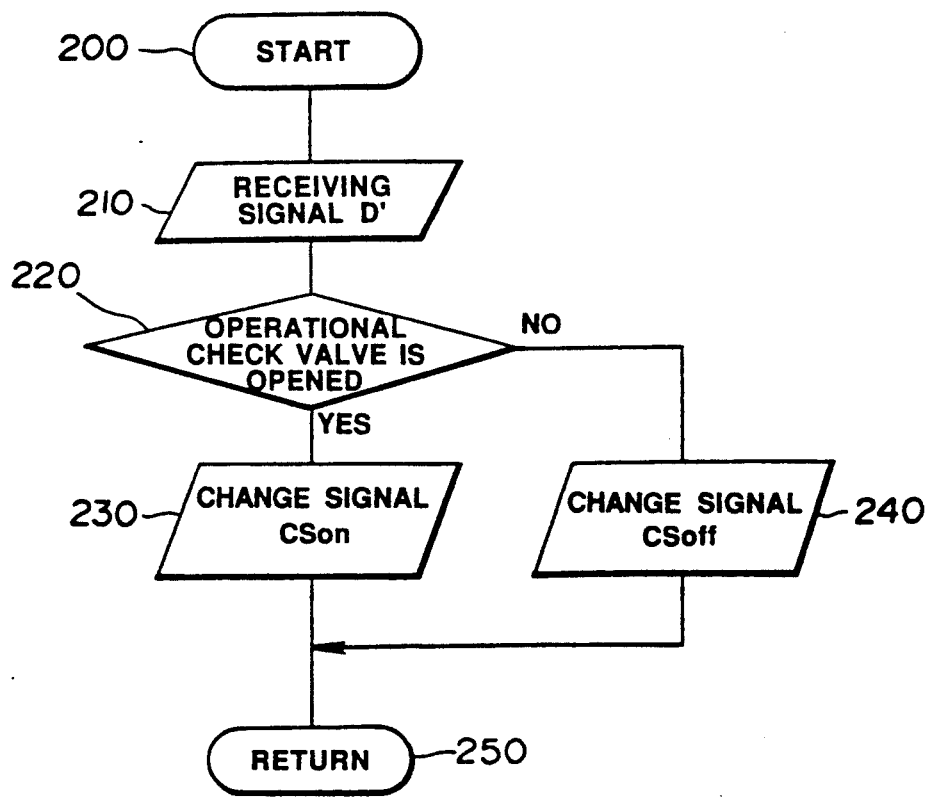
FIG. 8 is flowchart which shows logical steps carried out by a control unit of the second embodiment.

Referring to FIG. 8, there is shown a flowchart of a program, or sequence of logical steps, performed by the control unit 33 of the second embodiment. This program is carried out by timer interrupt at a preselected time interval beginning from an ignition switch ON operation.

After entering the program in step 200, the routine proceeds to step 210 wherein the control unit 33 receives the signal D' output from the displacement sensor 70. The routine then proceeds to step 220 wherein it is determined as to whether the operational check valve 52 is opened or not, that is, the supply pressure $P_S$ to the pressure control valves 26FL to 26RR is greater than the neutral pressure $P_N$ or not ($P_S > P_N$) based on the signal from the displacement sensor 70. Positive determination is made when the poppet 52B of the operational check valve 52 is thrust by the spool 52C to shorten the movable pin 70A of the displacement sensor 70 resulting in a value of the signal D' lower than a preselected value (i.e., a signal value when the poppet 52B blocks a path between the inlet port 52i and the outlet port 52o) to establish fluid communication between the inlet port 52i and the outlet port 52o.

If a YES answer is obtained in step 220 which is indicative of the opened operational check valve 52, the routine then proceeds to step 230 wherein the control unit 30 outputs the change signal $CS_{on}$ to open the fail-safe valve 22. If a NO answer is obtained which indicates the operational check valve is maintained closed, the routine proceeds to step 240 wherein the control unit 33 switches the change signal CS from $CS_{on}$ to $CS_{off}$ and outputs the $CS_{off}$ signal to the fail-safe valve 22. The routine then proceeds to step 250 and is returned to step 210.

In operation, if engine operation is stopped, the fail-safe valve 22 is maintained closed and the hydraulic circuit is blocked by the line pressure holding unit 2/ to hold line pressure therein similarly to the first embodiment.

After stopping the engine operation, if the ignition switch is actuated again, the control unit 30 is turned on to control the vehicle height and vehichle attitude and outputs the change signal $CS_{off}$ to the fail-safe valve 22 to keep it closed according to the program as shown in FIG. 8 because the signal D' from the displacement sensor 70 indicates the operational check valve 52 being closed. Additionally, rotation of the engine causes the hydraulic pump 42 to be rotated to provide working fluid under discharge pressure developed according to its rotational speed, thereby increasing pressure in the supply line 48s rapidly. When the pressure discharged from the pump 42 exceeds the line pressure held in the hydraulic circuit at that time, the working fluid flows into the hydraulic circuit through the check valve 50.

While the fail-safe valve 22 is closed the working fluid is restricted in its flow rate by the orifice 23 to prevent cylinder pressure of the hydraulic cylinders 28FL to 28R from increasing rapidly. It will be appreciated that increase in the vehicle height level toward a target level is slow. When the supply pressure $P_S$ reaches the neutral pressure $P_N$, the operational check valve 52 is changed from the closed positon to the opened position. This means that the poppet 52B is pushed by the spool 52C to shorten the movable pin 70A resulting in a lowered level of the signal D'. The control unit 33 monitors variation in the level of the signal D' to conclude that the operational check valve 52 is opened and switches the change signal to $CS_{on}$. The fail-safe valve 22 is thus opened to establish fluid communication in the supply line 48s and the return line 48r therethrough without fluid flow through the orifice 23. It will be appreciated that the working fluid flows into the hydraulic circuit without flow rate limitation caused by the orifice 23 to increase the supply pressure $P_S$ toward the preselected line pressure. Other operation is the same as that of the first embodiment. Therefore, the system of the second embodiment provides the same effect as that of the first embodiment.

The displacement sensor 70 may be provided with optical or magnetic sensors each of which monitors a displacement of the poppet 52B or the spool 52C of the operational check valve 52.

Figure 9:
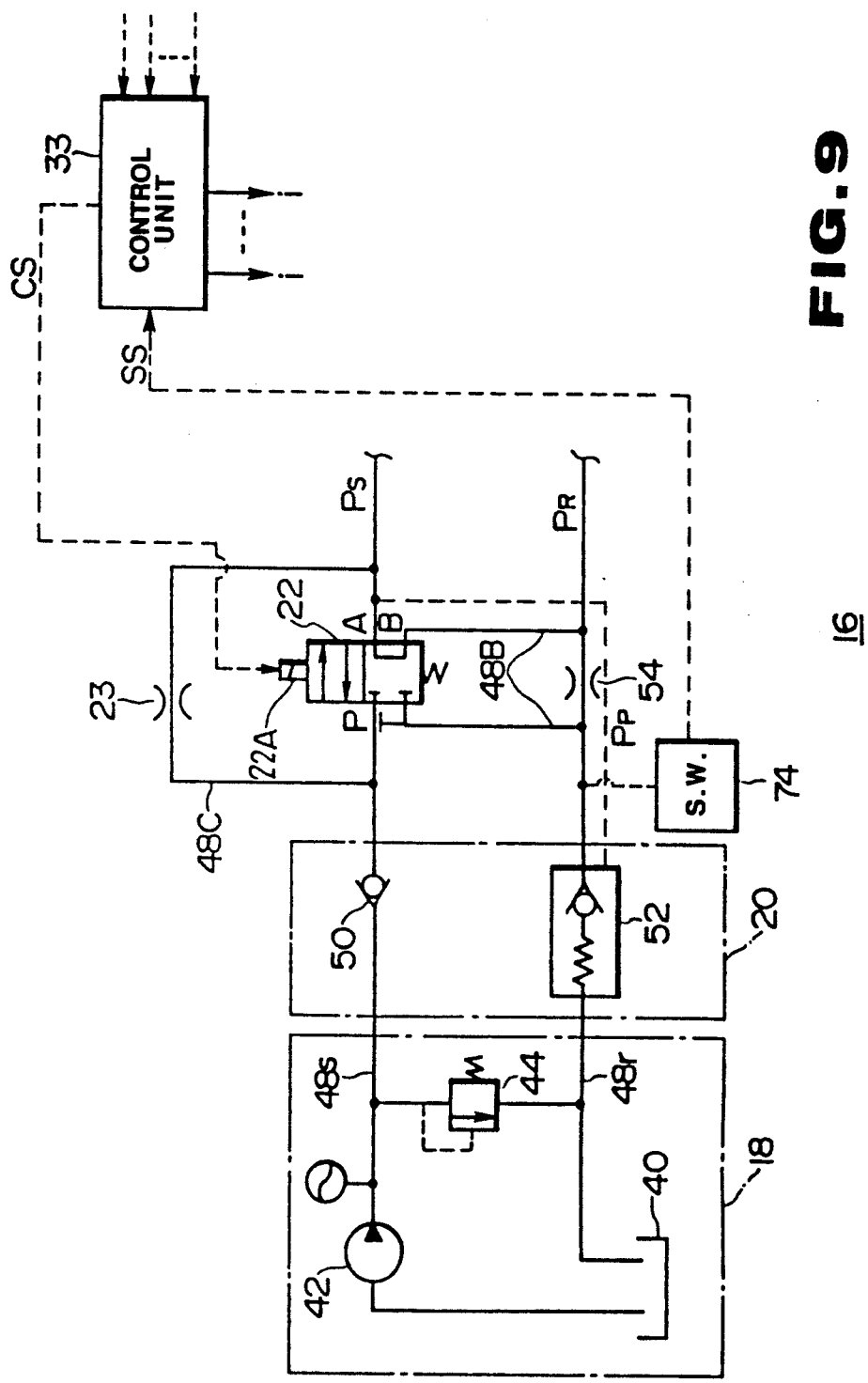
FIG. 9 is a circuit diagram which shows a hydraulic circuit of a third embodiment.

Referring to FIG. 9, a third embodiment of the invention is shown. The system of this embodiment includes the same line pressure holding unit 20 as that of the first embodiment. The system is operable to control operation of the line pressure holding unit 20 electrically based on pressure in the return line 48r or the return pressure $P_R$.

For electrically controlling the operation of the line pressure holding unit 20, the system includes a pressure switch 74 different from the pressure switch 70 of the first embodiment. The pressure switch 74 is arranged in the return line 48r between the operational check valve 52 and an orifice 54. The pressure switch 74 is turned on in response to a return pressure $P_R$ greater than a preselected pressure $P_{00}$ (for example, 10 kgf/Cm$^2$ substantially equal to atmospheric pressure), and is turned off responsive to a return pressure $P_R$ less than the preselected pressure $P_{00}$ and outputs a signal SS indicative thereof to a control unit 33.

Figure 10:
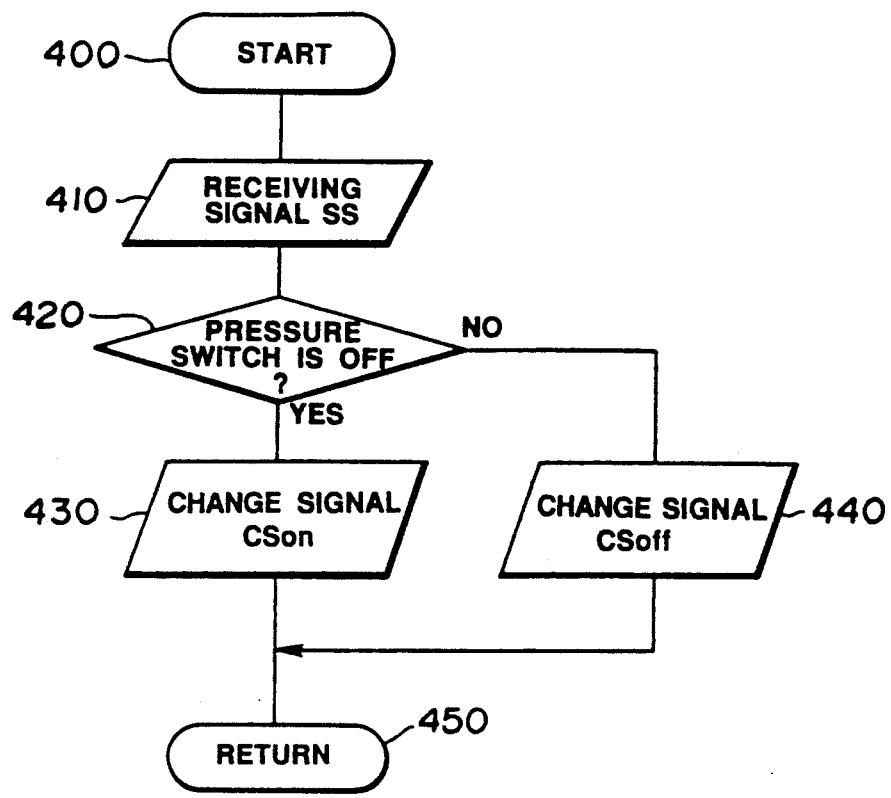
FIG. 10 is a flowchart which shows logical steps performed by a control unit of the third embodiment.

Referring to FIG. 10, there is shown a flowchart of a program or sequence of logical steps performed by the control unit 33 of the third embodiment for controlling the fail-safe valve 22. This program is substantially the same as that in FIG. 4. It is, however, different therefrom in that, in step 420, it is determined whether the pressure switch is turned off or not. If the pressure switch is off, the routine then proceeds to step 430 wherein the control unit 33 outputs the change signal $CS_{on}$ to open the fail-safe valve 22. On the other hand, if the pressure switch is on, the routine proceeds to step 440 wherein the control unit 33 outputs the change signal $CS_{off}$ to the fail-safe valve 22 to close same. It will be appreciated that the determination in step 420 of FIG. 10 is the reverse of that in step 120 of FIG. 4. Other construction and operations are the same as those of the first embodiment.

Therefore, before the supply pressure $P_S$ is built up toward the neutral pressure $P_N$ after starting engine operation, pressure in the hydraulic circuit is held by the line pressure holding unit 20 and thus the return pressure $P_R$ is greater than the preselected pressure pressure $P_{00}$ (for example, atmospheric pressure). The fail-safe valve 22 is thus maintained closed according to steps 410, 420, and 440 so that the orifice 23 restricts a flow rate in the supply line 48s. Afterward, when the supply pressure $P_S$ reaches the neutral pressure $P_N$, the operational check valve 52 is opened to release the pressure held in the hydraulic circuit and thus the return pressure $P_R$ is substantially lowered to the atmospheric pressure, thereby causing the pressure switch 74 to be turned off to open the fail-safe valve 22 according to steps 410, 420, and 430 in FIG. 10. Thus, the working fluid is supplied directly to the hydraulic circuit through the fail-safe valve 22 without limitation of flow rate by the orifice 23.

It will be appreciated that the system of the third embodiment provides the same effect as that of the first and second embodiments.

The pressure switch 74 may monitor the return pressure in a line downstream from the orifice 54. Additionally, the pressure switch 74 may be replaced with a pressure sensor which monitors the return pressure continuously and outputs a signal indicating that the line pressure holding operation is released when the monitored pressure is decreased below a preselected level. Further, a pressure difference sensor may be provided which monitors a pressure difference between the inlet port 52i and outlet port 52o of the operational check valve 52 and outputs a signal indicating that the line pressure holding operation is released when the monitored pressure difference is lowered below a preselected pressure level (e.g., zero).

Figure 11:
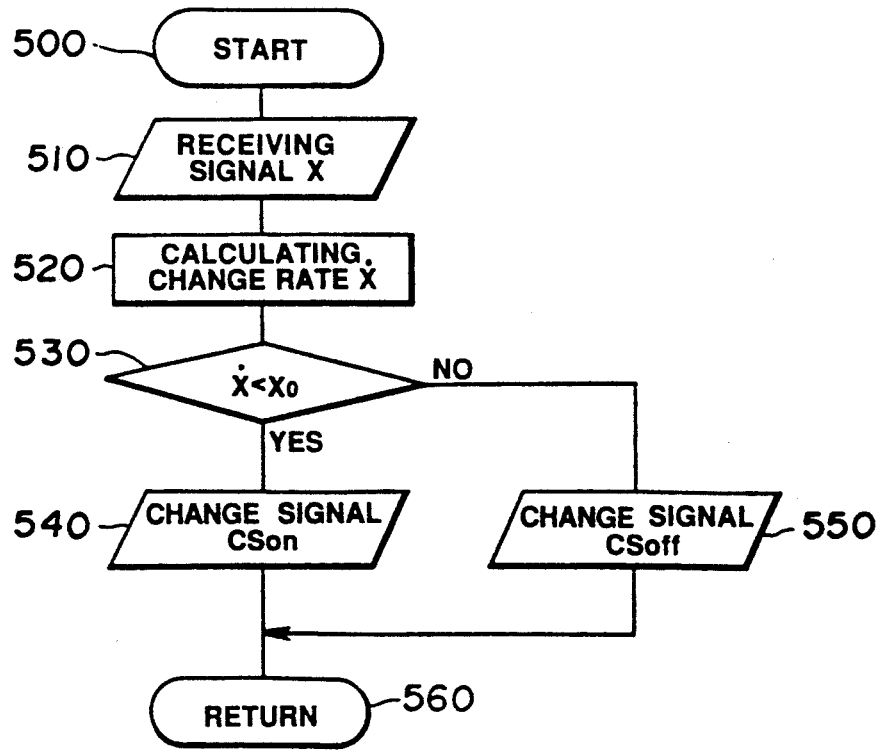
FIG. 11 is a flowchart which shows logical steps performed by a control unit of a fourth embodiment.

Referring to FIG. 11, there is shown a flowchart of a program or sequence of logical steps performed by a control unit 33 of a fourth embodiment of the invention. The system of the fourth embodiment is adapted for electrically controlling operation of a line pressure holding unit 20 according to variation in vehicle height level.

As already mentioned, if line pressure held by a line pressure holding unit 20 before starting engine operation is lower than the neutral pressure $P_N$ due to oil leakage for example, the line pressure after starting engine operation or working pressure in the hydraulic cylinders 28FL to 28RR rises (see the control pressure $P_C$ between the times $t_6$ and $t_7$ in FIG. 5), thereby causing the vehicle height level to be increased. An increase rate of the vehicle height level is determined by flow rate restriction caused by an orifice 23. When the working pressure in the hydraulic cylinders reaches the neutral pressure $P_N$, the control unit 33 effectively controls the hydraulic cylinders to maintain their cylinder pressure at the neutral pressure $P_N$ for maintaining a vehicle body at a level orientation at a regulated vehicular height. It is thus assumed that when variation in the vehicle height level is almost low, the supply pressure $P_S$ reaches the neutral pressure $P_N$ and the line pressure holding operation is released. It will be noted that based on the variation in the vehicle height level the system is operable to control the line pressure holding unit 20.

For performing the above control, the system includes control unit 33 which carries out a program as shown in FIG. 11 in place of the program for controlling operation of the fail-safe valve 22 based on the signal SS from the pressure switch 29 shown in FIG. 1.

The program of FIG. 11 is carried out by timer interrupt at a predetermined time interval to set pressure in the hydraulic cylinders 28FL to 28RR to the neutral pressure $P_N$ according to the vehicle height control, after an ignition switch is turned on.

After the timer interruption in step 500, the routine proceeds to step 510 wherein the control unit 33 receives signals indicative of parameters X associated with vehicle height level signals output from the vehicle height sensors 31FL to 31RR. The routine then proceeds to step 510 wherein the parameter x is mathematically differentiated with respect to time to determine a rate of vehicle height change x. The routine then proceeds to step 530 wherein it is determined as to whether the rate of vehicle height change x is less than or equal to a reference value $x_0$ (the $x_0$ is a threshold assuming that the vehicle height change is essentially zero). If a YES answer is obtained, the routine proceeds to step 540 wherein it is concluded that the line pressure holding operation has been released and the control unit 33 outputs the change signal $CS_{on}$ to open the fail-safe valve 22. If a NO answer is obtained in step 530 ($x > x_0$), the routine proceeds to step 550 wherein the control unit 33 outputs the change signal $CS_{off}$ to maintain the fail-safe valve 22 in a closed position.

Therefore, when increase in vehicle height is low within the preselected time after starting the engine operation, it is concluded that the line pressure holding unit 20 releases line pressure held in the hydraulic circuit. The opened fail-safe valve 22 essentially cancels restriction of a flow rate caused by the orifice 23. It will be appreciated that the instant system provides the advantage of obtaining the same effect as previous embodiments by means of fewer sensors.

Figure 12:
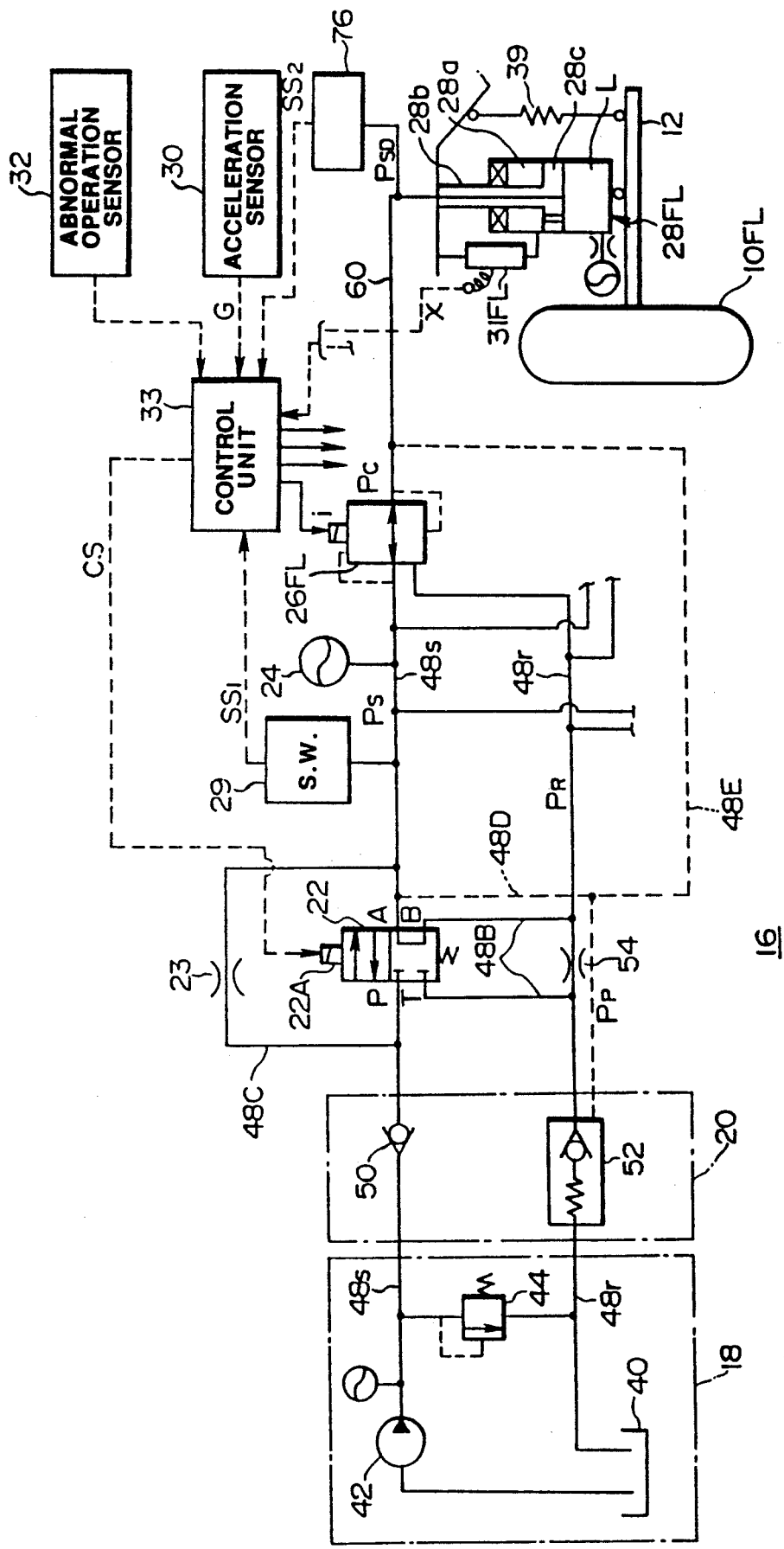
FIG. 12 is a circuit arrangement which shows a hydraulic circuit of a fifth embodiment.

Referring to FIG. 12, a fifth embodiment of the invention is shown. The system of this embodiment is adapted for releasing line pressure holding operation of a line pressure holding unit 20 at a time when supply pressure $P_S$ rises after starting engine operation and pressure in the hydraulic circuit, blocked by the line pressure holding unit 20, exceeds neutral pressure $P_N$ completely.

For the sake of simplicity, FIG. 12 shows a suspension arrangement for a front-left wheel 10FL only. The system is different from the first embodiment in that a pilot port of an operational check valve 52 is communicated with a hydraulic line 60 (providing cylinder pressure $P_{SD}$ to a hydraulic cylinder 28FL) disposed between a pressure control valve 26FL and a hydraulic cylinder 28FL through a line 48E in addition to fluid communication with a supply line 48s (providing supply pressure $P_S$) between a fail-safe valve 22 and the pressure control valve 26FL through a line 48D. Thus, pressure balanced by the supply pressure $P_S$ and the cylinder pressure $P_{SD}$ is provided as a pilot pressure $P_P$ (operation pressure). The operational check valve 52 is responsive to the pilot pressure $P_P$ below the neutral pressure $P_N$ to be closed. Thus, even if a pressure difference between the supply pressure $P_S$ and the cylinder pressure $P_{SD}$ occurs due to a longer line of the hydraulic circuit, the line pressure holding operation of the line pressure holding unit 20 is released only when the balanced pressure exceeds the neutral pressure $P_N$. This results in further improved accuracy of timing to release the line pressure holding operation.

The system includes a pressure switch 76 which detects pressure $P_{SD}$ in a portion of the line 60 adjacent to the hydraulic cylinder 28FL to be turned on when the pressure $P_{SD}$ exceeds the neutral pressure $P_N$ to provide a signal $SS_2$ to the control unit 33 and a pressure switch 29 which is, similar to the first embodiment, responsive to the supply pressure $P_S$ above the neutral pressure $P_N$ to provide a signal $SS_1$ to the control unit 33.

Figure 13:
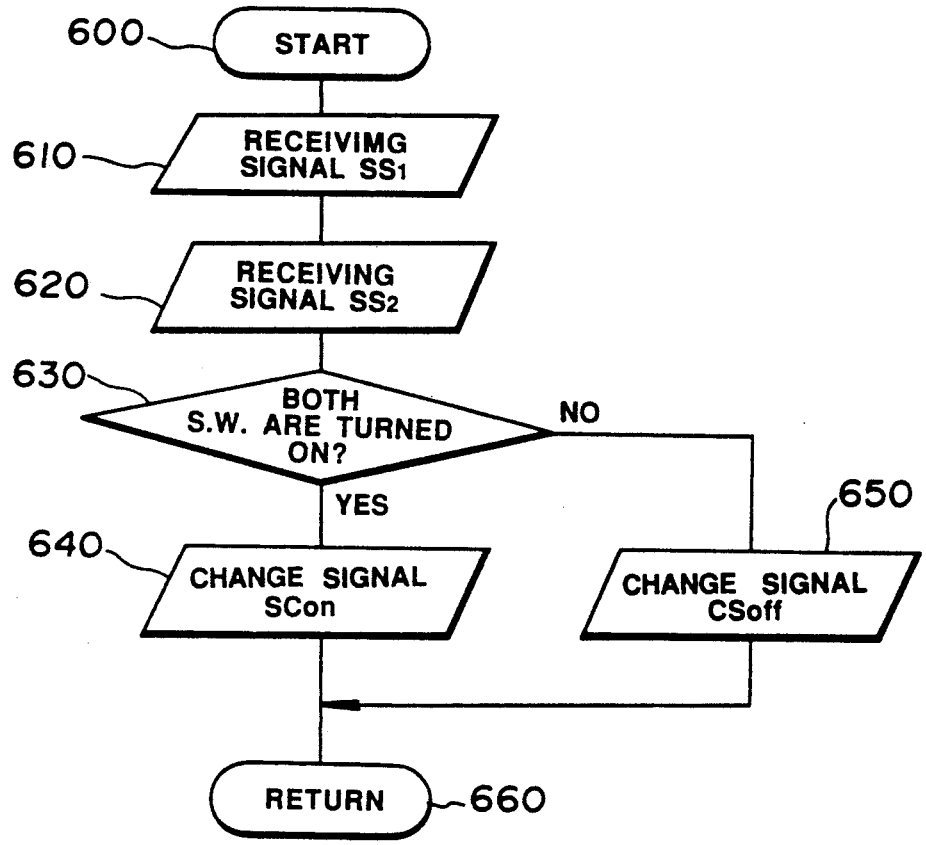
FIG. 13 is a flowchart which shows logical steps performed by a control unit of the fifth embodiment.

Referring to FIG. 13, a flowchart of a program or sequence of logical steps performed by the control unit 33 is shown. Similarly to the above embodiments, the program is carried out by timer interrupt at every cycle of a predetermined time interval after starting engine operation.

After timer interruption in step 600, the routine proceeds to step 610 wherein the control unit 33 receives the signal $SS_1$ output from the pressure switch 29. The routine then proceeds to step 620 wherein the control unit 33 also receives the signal $SS_2$ output from the pressure switch 76. The routine then proceeds to step 630 wherein it is determined as to whether both pressure switches 29 and 76 are turned on or not. If a YES answer is obtained, the routine proceeds to step 640 wherein the control unit 33 outputs the change signal $CS_{on}$ to open the fail-safe valve 22. If a NO answer is obtained, the routine proceeds to step 650 wherein the control unit 33 provides the change signal $CS_{off}$ 22 to keep the fail-safe valve 22 closed. The routine then proceeds to step 660 to be returned to step 610.

According to the above embodiment, it is assumed that the line pressure holding operation has been released when the supply pressure $P_S$ in an input line of the line pressure holding unit 22 connecting to a hydraulic power source unit 18 coincides with the cylinder pressure $P_{SD}$ and both pressures exceed the neutral pressure. This allows working fluid to flow in the hydraulic circuit through the fail-safe valve 22 without flow rate limitation caused by orifice 23. It will be appreciated that the same effect as that of the above embodiments is provided.

While in this embodiment, the system includes two pressure switches 29 and 76, pressure sensors which monitor pressure continuously may be provided. The line 48E communicating with the pilot port of the operational check valve 22 may be connected to a line of a hydraulic cylinder for a rear wheel.

Figure 14:
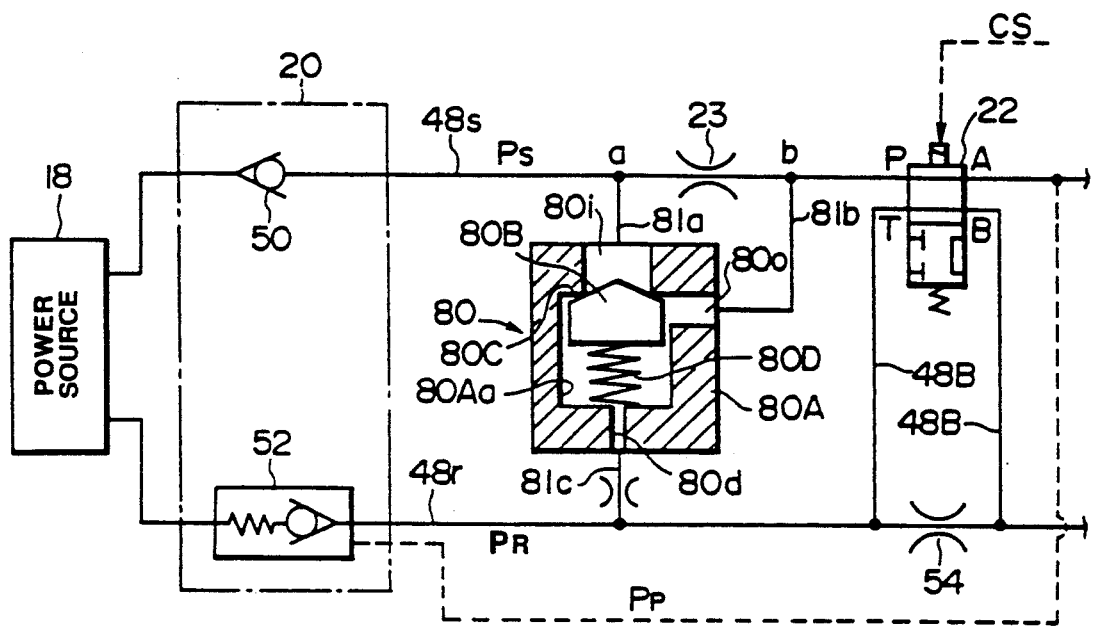
FIG. 14 is a section of a hydraulic circuit of a sixth embodiment.

Referring to FIG. 14, a system of a sixth embodiment is shown. This system is adapted for mechanically changing a flow rate of working fluid flowing through a hydraulic circuit after starting engine operation instead of electrically effecting flow rate control as in the previous embodiments.

The system includes generally a pilot type directional control valve 80 disposed in a supply line 48s and a return line 48r between a line pressure holding unit 20 and a fail-safe valve 22. The directional control valve 80 includes a cylindrical valve housing 80A through which a valve bore 80Aa is formed, an inlet port 80i, an outlet port 80o, a drain port 80d which communicates with the valve bore 80Aa, and a poppet 80B. The poppet 80B is slidably disposed in the valve bore 80Aa so as to be urged against a valve seat 80C formed between the inlet port 80i and the outlet port 80o by a coil spring 80D. The inlet port 80i communicates with the supply line 48s at a junction a through a line 81a. The outlet port 80o also communicates with the supply line 48s at a junction b through a line 81b. The drain port 80d communicates with the return line 48r through a line 81c. An orifice 23 which, restricts flow rate just after engine operation is started, is arranged between the junctions a and b.

Therefore, supply pressure $P_S$ is input to the inlet port 80i of the directional control valve 80 for providing pilot pressure. When the thrusting force acting on the poppet 80B created by the supply pressure $P_S$ (the pilot pressure) overcomes a spring force of the coil spring 80D and fluid communcation between the inlet port 80i and the outlet port 80o is achieved. A spring constant of the coil spring 80D is set to a value necessary for shortening the coil spring when the supply pressure $P_S$ exceeds the neutral pressure $P_N$. Other arrangements and operation are the same as those of the above embodiments.

Figure 15:
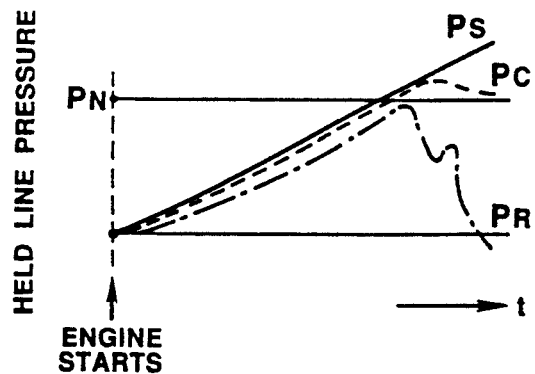
FIG. 15 is a graph which shows line pressure held in a hydraulic circuit after engine operation has started.
Figure 16:
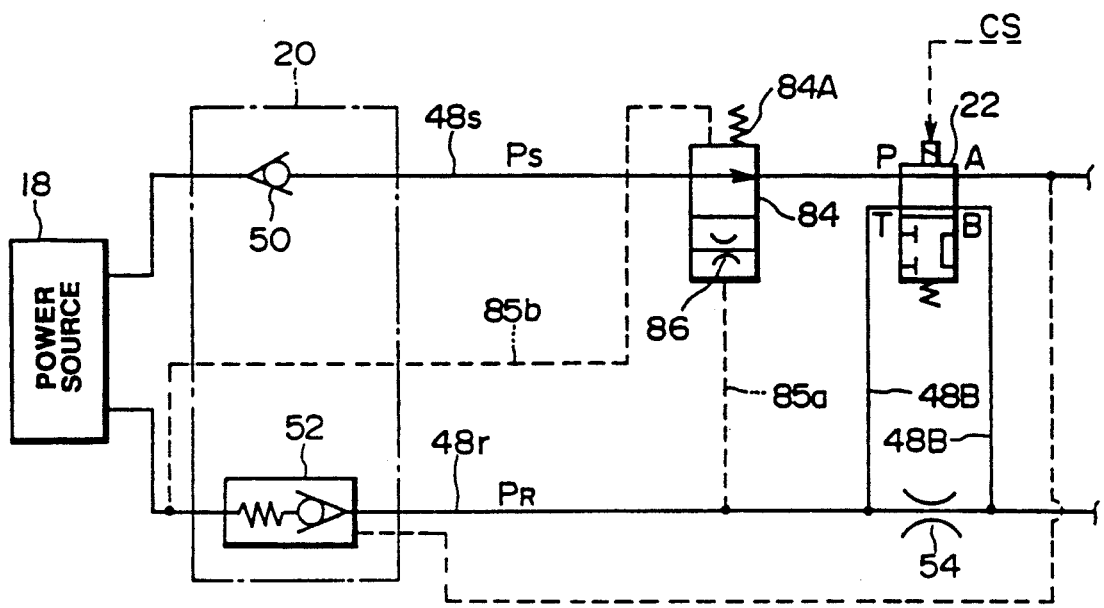
FIG. 16 is a section of a hydraulic circuit of a seventh embodiment.

In operation, rising of the supply pressure $P_S$ over the pressure in the line pressure holding unit 20, after starting engine operation, allows working fluid to flow into the hydraulic circuit through a check valve 50. If the pilot pressure of the directional control valve 80 or the supply pressure $P_S$ still does not exceed the neutral pressure, the inlet port 80i and the outlet port 80o are blocked by the poppet 80B and thus the working fluid in the supply line 48s is restricted in flow rate by the orifice 23. This flow rate restriction prevents a vehicle body from rising too rapidly to the regulated vehicle height during the time the line pressure in hydraulic circuit is rising toward the neutral pressure $P_N$ from the held line pressure as shown in FIG. 16. In FIG. 15, pressure $P_C$ denotes pressure in a line downstream from a pressure control valve. It will be appreciated that when engine operation is started again within a short time after having been stopped, pressure in the hydraulic circuit blocked by the line pressure holding unit 20 is relatively high. However, flow rate restriction is securely established by the orifice 23 to lift the vehicle body gradually to the regulated vehicle height level.

The supply pressure $P_S$ reaching the neutral pressure $P_N$ causes the directional control valve 80 to establish fluid communication therethrough, the working fluid thereby flowing through the directional control valve 80 essentially without flow rate restriction caused by the orifice 23. The system thus responds to vehicle height and attitude control quickly, without effecting uncomfortable height or attitude changes too quickly, so that passenger comfort is assured. There is no marginal time, as occurs in conventional systems, until the system operates effectively.

Additionally, there is a pressure difference between upstream and downstream lines of the fail-safe valves at a point in time when the fail-safe valve is opened in conventional systems. This pressure difference causes hydraulic pressure in the lines to interfere with each other, generating noise. The system of the invention however does not have such a drawback. Further, the above system is provided with mechanical parts in place of the electrical sensors of previously mentioned systems and thus does not require extensive wire harnesses. It will be noted that according to this system malfunctions, due to breaking of wire or short circuits, may effectively be minimized.

Referring to FIG. 16, there is shown a system of a seventh embodiment of the invention. This system is adapted for changing a flow rate of working fluid flowing through a hydraulic circuit similarly to the sixth embodiment.

The system includes a pilot-operated directional control valve 84 in a supply line 48s. The directional control valve 84 is provided with a spool valve which has two ports providing two directional positions. The spool valve includes a spool to sides of which pressure upstream and downstream of an operational check valve 52 are directed through lines 85a and 85b for providing first and second pilot pressures respectively. The side of the spool which is acted on by the pressure downstream of the operational check valve 52 is urged by a spring 84A. When the first and second pilot pressures are equal to each other, the spool is kept at a neutral position to establish fluid communication between both ports for allowing working fluid to flow therethrough without flow rate limitation. When the spool is shifted from the neutral position to an offset position, the working fluid flows through an orifice 86 with throttled flow to the operational check valve 22.

When line pressure in the hydraulic circuit is held when engine operation is stopped, pressure upstream from the operational check valve 52 is higher than that downstream therefrom to cause the spool of the spool valve 84A to be shifted toward the offset position, providing throttled flow through the spool valve 84A. When the fail-safe valve 22 is actuated to be opened, the line pressure holding operation is released to provide both return pressures $P_R$ upstream and downstream of the operational check valve 52 substantially equal to atmospheric pressure. The spool of the spool valve 84A is maintained at the neutral position to allow the working fluid in the supply line 48s to flow through the spool valve without flow rate limitation. It will be appreciated that the same effect as that of the sixth embodiment is provided by the seventh embodiment.

In the above system, the directional control valve 84A may be provided with a pilot-operated cut-off valve with an orifice separate from the cut-off valve being arranged parallel thereto. Additionally, all of the above described systems may utilize air or oil as the working fluid.

Figure 17:
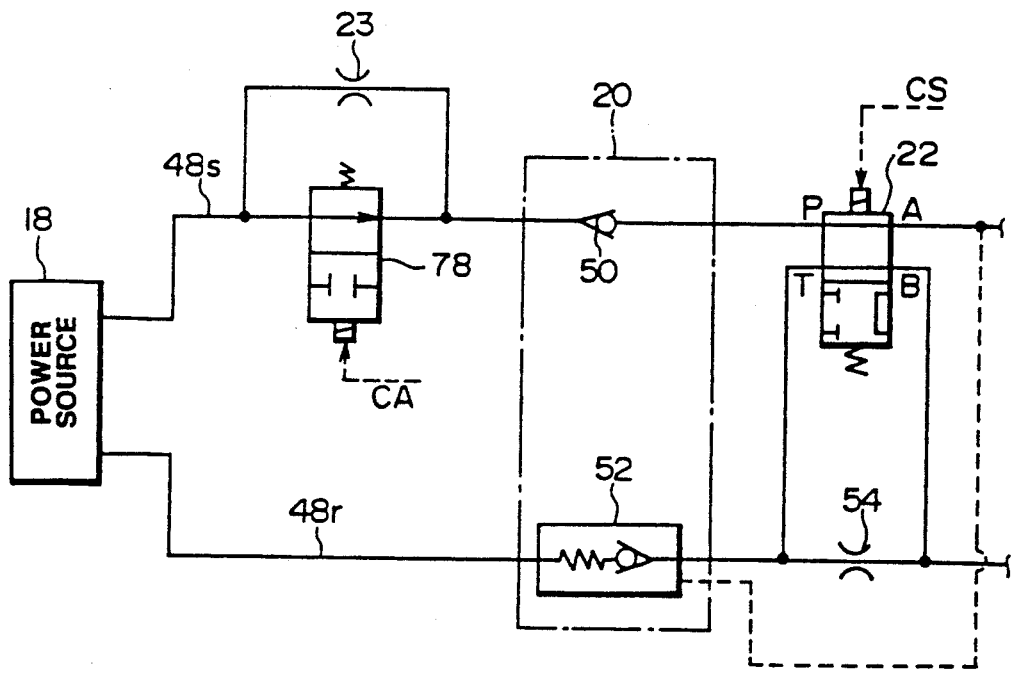
FIG. 17 is an illustration which shows a modification of a fail-safe valve arranged in a supply line of a hydraulic circuit.

Referring to FIG. 17, a modification of the fail-safe valve set forth in the above is shown.

The system of FIG. 17 includes a shut-off valve 78 which is disposed in the supply line 48s between the hydraulic power source unit 18 and the line pressure holding unit 20 with an orifice 23 arranged parallel to the shut-off valve. The control unit 33 outputs the change signal CS to both the shut-off valve 78 and the fail-safe valve 22 to control operation thereof at the same time.

As already mentioned, the system of the invention is operable to monitor operation of a line pressure holding unit to determine whether a pressure is being held in a hydraulic circuit or not. When the line pressure holding unit blocks the hydraulic circuit to hold the line pressure therein, a directional control valve disposed in a supply line is closed to provide flow rate limitation via an orifice therein. When the line pressure holding operation is released, the directional control valve is opened to establish fluid communication through the supply line without the flow rate limitation. Therefore, if engine operation is started when the line pressure in the hydraulic circuit, blocked by the line pressure holding unit, is low, the orifice restricts the flow rate of working fluid flowing through the supply line before the line pressure holding operation is released, preventing line pressure from increasing rapidly and allowing the vehicle body to rise gradually to the regulated vehicle height. This is advantageously comfortable for vehicle passengers. Additionally, on releasing the hydraulic circuit, the working fluid flows without flow rate restriction for effectively controlling vehicle height and attitude. It will be appreciated that there is no marginal time during which system efficiency is compromised, such as due to lack of working fluid at the beginning of suspension control.

What is claimed is:

1. An active suspension system for an automotive vehicle, comprising:

suspension assemblies disposed between a vehicle body and suspension members which respectively support vehicle wheels rotatably, each of the suspension assemblies including a fluid cylinder with adjustable cylinder pressure for active suspension control;

a fluid power source unit which supplies fluid pressurized above a preselected pressure level required for the active suspension control to the fluid cylinders;

a fluid circuit including supply and return lines which communicate between the fluid cylinders and said fluid power source unit for circulating the pressurized fluid therebetween;

line pressure holding means responsive to a line pressure provided to the fluid cylinders lower than a preselected pressure level for holding the line pressure in said fluid circuit;

a pressure sensor which detects the line pressure to provide a signal indicative thereof;

an abnormal operation sensor which detects malfunction of system operation to provide a signal indicative thereof;

valve means including an orifice and a fail-safe valve, the orifice being disposed in the supply line which provides fluid flow at a first flow rate, the fail-safe valve being arranged parallel to said orifice for providing fluid flow at a second flow rate higher than the first flow rate, said fail-safe valve having first and second valve positions, the first valve position being to block the fluid flow at the second flow rate and the second valve position being to allow the fluid flow at the second flow rate, said fail-safe valve means being adapted to establish the first valve position when system operation starts; and a controller responsive to the signal from said abnormal operation sensor to provide a first control signal to the fail-safe valve for blocking the supply line of said fluid circuit downstream from said line pressure holding means and connecting the blocked supply lines upstream and downstream from said fail-safe valve with the return line respectively, said controller being further responsive to the signal from said pressure sensor to determine an operation status of said line pressure holding means to provide a second control signal to the fail-safe valve to change from the first valve position to the second valve position when operation of the line pressure holding means is released.

2. An active suspension system for an automotive vehicle, comprising:

suspension assemblies disposed between a vehicle body and suspension members which respectively support vehicle wheels rotatably, each of the suspension assemblies including a fluid cylinder with adjustable cylinder pressure for active suspension control;

a fluid power source unit which supplies fluid pressurized above a preselected pressure level required for the active suspension control to the fluid cylinders;

a fluid circuit, including supply and return lines which communicate between the fluid cylinders and said fluid power source unit for circulating the pressurized fluid therebetween;

line pressure holding means responsive to line pressure provided to the fluid cylinders lower than a preselected pressure level, for providing an enclosed loop downstream from said fluid power source which includes the fluid cylinders to hold the line pressure in the enclosed loop;

a vehicle height sensor which detects a vehicle height level to provide a signal indicative thereof;

a controller responsive to the signal from said vehicle height sensor to determine a change rate of the vehicle height level and provide a signal indicating that operation of said line pressure holding means is released when the change rate is less than a preselected threshold rate;

valve means including an orifice and a directional control valve arranged parallel to each other in the supply line, the orifice providing fluid flow at a first flow rate, the directional control valve providing fluid flow at a second flow rate higher than the first flow rate, the directional control valve having first and second valve positions, the first valve position being to block the fluid flow at the second flow rate, the second valve position being to allow the fluid flow at the second flow rate, the directional control valve being adapted to establish the first valve position when system operation starts and being responsive to the signal from said controller to change from the first valve position to the second valve position.

3. An active suspension system for an automotive vehicle, comprising:

suspension assemblies disposed between a vehicle body and suspension members which respectively support vehicle wheels rotatably, each of the suspension assemblies including a fluid cylinder with adjustable cylinder pressure for active suspension control;

a fluid power source unit which supplies fluid, pressurized above a preselected pressure level required for active suspension control, to the fluid cylinders;

a fluid circuit including supply and return lines which communicate between the fluid cylinders and said fluid power source unit for circulating the pressurized fluid therebetween;

pressure control valves each disposed between said fluid power source and the fluid cylinder for controlling fluid pressure supplied from said fluid power source to the fluid cylinder for effecting the active suspension control;

line pressure holding means, responsive to line pressure provided to the fluid cylinders lower than a preselected pressure level, for providing an enclosed loop downstream from said fluid power source which includes the fluid cylinders, to hold the line pressure in the enclosed loop;

a first sensor detecting a first pressure upstream from said pressure control valves to provide a signal indicative thereof;

a second sensor detecting a second pressure downstream from said pressure control valves to provide a signal indicative thereof;

valve means, disposed between said line pressure holding means and the fluid cylinders, for providing fluid flow from said fluid power source unit to the fluid cylinders at a first flow rate and a second flow rate higher than the first flow rate; and a controller providing a first control signal to said valve means when system operation starts for blocking the fluid flow at the second flow rate and allowing the fluid flow at the first flow rate, said controller being responsive to respective signals from said first and second sensors to determine an operational status of said line pressure holding means to provide a second control signal to said valve means for allowing fluid flow at the second flow rate when operation of said line pressure holding means is released.

4. An active suspension system for an automotive vehicle, comprising:

suspension assemblies disposed between a vehicle body and suspension members which respectively support vehicle wheels rotatably, each of the suspension assemblies including a fluid cylinder with adjustable cylinder pressure for active suspension control;

a fluid power source unit which supplies fluid pressurized above a preselected pressure level required for active suspension control to the fluid cylinders;

a fluid circuit, including supply and return lines which communicate between the fluid cylinders and said fluid power source unit for circulating the pressurized fluid therebetween;

line pressure holding means responsive to line pressure provided to the fluid cylinders lower than a preselected pressure level, for providing an enclosed loop downstream from said fluid power source which includes the fluid cylinders, to hold the line pressure in the enclosed loop;

an orifice disposed in the supply line for providing fluid flow at a first flow rate and a directional control valve having an inlet port communicating with a portion of the supply line upstream from said orifice and an outlet port communicating with a portion of the supply line downstream from said orifice, said directional control valve being responsive to a line pressure in the supply line introduced through the inlet port which is greater than said preselected pressure level to establish fluid communication between the inlet and outlet ports for providing fluid flow at a second flow rate higher than the first flow rate.

5. An active suspension system as set forth in claim 4, wherein:

said directional control valve is arranged downstream from said line pressure holding means.

6. An active suspension system as set forth in claim 5, further comprising:

a fail-safe valve disposed downstream from said directional control valve, the fail-safe valve being responsive to a signal indicating malfunction of system operation to block the supply line of said fluid circuit downstream from said line pressure holding means and connecting the blocked supply lines upstream and downstream from said fail-safe valve with the return line respectively.

7. An active suspension system as set forth in claim 4, wherein:

said directional control valve includes a poppet and a spring urging the poppet to block fluid communication between the inlet and outlet ports under a line pressure introduced through the inlet port of less than the preselected pressure level and to allow fluid communication between the inlet and outlet ports under a line pressure introduced through the inlet port greater than the preselected pressure level.

8. An active suspension system for an automotive vehicle, comprising:

suspension assemblies disposed between a vehicle body and suspension members which respectively support vehicle wheels rotatably, each of the suspension assemblies including a fluid cylinder with adjustable cylinder pressure for active suspension control;

a fluid power source unit which supplies fluid pressurized above a preselected pressure level required for active suspension control to the fluid cylinders;

a fluid circuit including supply and return lines which communicate between the fluid cylinders and said fluid power source unit for circulating the pressurized fluid therebetween;

line pressure holding means responsive to line pressure provided to the fluid cylinders lower than a preselected pressure level, for providing an enclosed loop downstream from said fluid power source, which includes the fluid cylinders, to hold the line pressure in the enclosed loop; and a directional control valve, disposed in the supply line, having an orifice therein which provides fluid flow at a first flow rate, said directional control valve including first and second valve positions, the first valve position being to provide fluid flow at a second flow rate higher than the first flow rate, the second valve position being to block the fluid flow at the second flow rate and allow the fluid flow at the first flow rate through the orifice, said directional control valve being responsive to a pressure difference between portions of the return line upstream and downstream of said line pressure holding means, said directional control valve establishing the first valve position when the pressure difference is substantially equal to zero.

9. An active suspension system as set forth in claim 8, wherein:

said line pressure holding means includes a check valve disposed in the supply line which allows fluid flow from said fluid power source to said suspension assemblies and blocking back flow to said fluid power source and a pilot-operated check valve disposed in the return line which allows fluid flow in the return line to said fluid power source and blocks back flow to said suspension assemblies, said pilot-operated check valve being also responsive to line pressure in the supply line downstream from said check valve which is less than said preselected pressure level to block the fluid flow in the return line to said fluid power source, said directional control valve establishing the first valve position when online pressures upstream and downstream of the pilot-operated check valve are equal to each other.

10. An active suspension system as set forth in claim 9, further comprising:

a fail-safe valve disposed downstream from said directional control valve, the fail-safe valve being responsive to a signal indicating malfunction of system operation to block the supply line of said fluid circuit downstream from said line pressure holding means and connecting the blocked supply lines upstream and downstream from said fail-safe valve with the return line respectively, said pilot-operated check valve being responsive to line pressure in the supply line downstream from said fail-safe valve which is less than said preselected pressure level to block fluid flow from the return line to said fluid power source.

* * * * *